E. L. THOMPSON.
CONVERTIBLE BODY FOR MOTOR VEHICLES.
APPLICATION FILED MAY 16, 1914.

1,131,875.

Patented Mar. 16, 1915.
2 SHEETS—SHEET 1.

Witnesses
Robert M. Sutphen
A. L. Hind

Inventor
E. L. Thompson

By Watson E. Coleman
Attorney

E. L. THOMPSON.
CONVERTIBLE BODY FOR MOTOR VEHICLES.
APPLICATION FILED MAY 16, 1914.
1,131,875.
Patented Mar. 16, 1915.
2 SHEETS—SHEET 2.
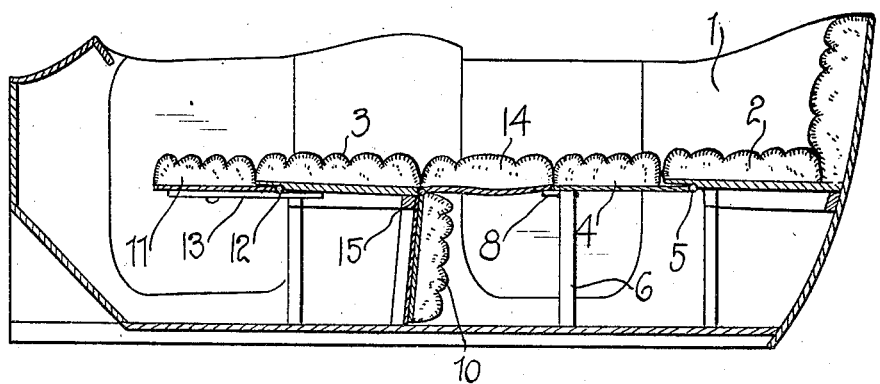
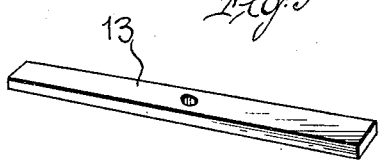
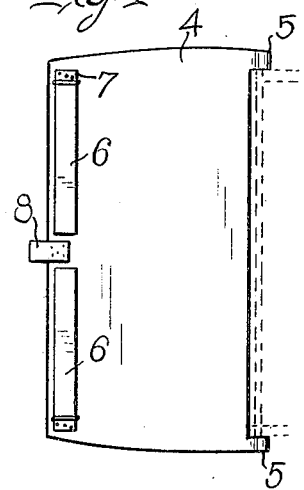
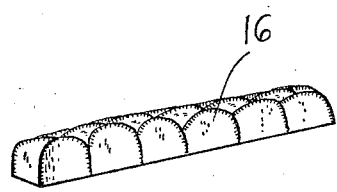
Witnesses
Robert M. Sutphen
A. S. Hind
Inventor
E. L. Thompson
By Watson E. Coleman
Attorney

UNITED STATES PATENT OFFICE.

EDWARD L. THOMPSON, OF GLENNS FERRY, IDAHO.

CONVERTIBLE BODY FOR MOTOR-VEHICLES.

1,131,875.   Specification of Letters Patent.   Patented Mar. 16, 1915.

Application filed May 16, 1914. Serial No. 839,098.

*To all whom it may concern:*

Be it known that I, EDWARD L. THOMPSON, a citizen of the United States, residing at Glenns Ferry, in the county of Elmore and State of Idaho, have invented certain new and useful Improvements in Convertible Bodies for Motor-Vehicles, of which the following is a specification, reference being had to the accompanying drawings.

This invention relates to new and useful improvements in motor vehicles and more particularly to a convertible body for motor vehicles, the main object of the invention being the provision of a convertible body for motor vehicles whereby the same may be readily converted into a full sleeping compartment or may be converted into a part touring and a part sleeping body as the case may be.

Another object of the present invention is the provision of a device of the above character which can be applied to any make of motor vehicle and is so arranged as not to change the neat appearance of the vehicle in any manner whatever.

Another object of the present invention is the provision of a device of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

Figure 1:
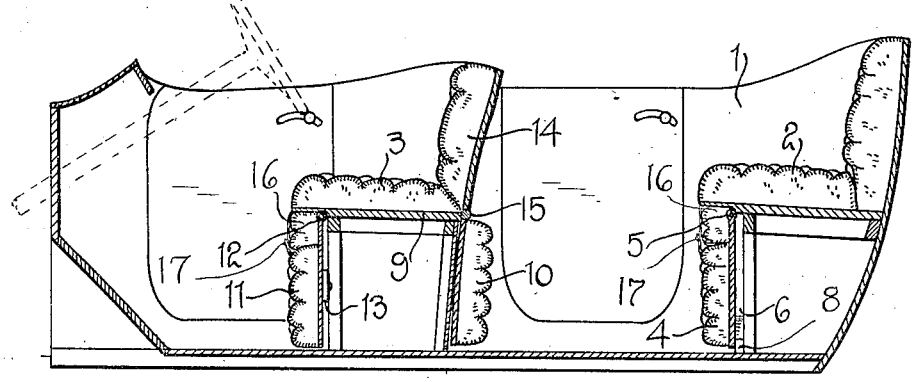
Figure 2:
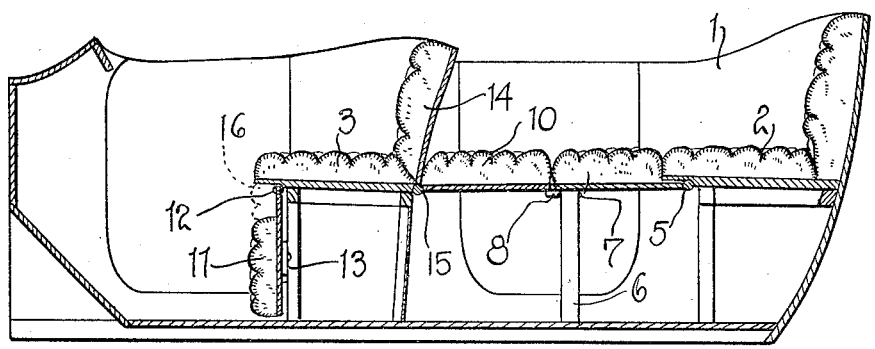

In the accompanying drawings forming a part of this application, Figure 1 is a longitudinal sectional view of a vehicle body constructed in accordance with my invention. Fig. 2 is a similar view illustrating the tonneau thereof as converted into a sleeping compartment. Fig. 3 is a similar view illustrating the entire body as converted into a sleeping compartment. Fig. 4 is a bottom plan view of one of the supporting members. Fig. 5 is a detail perspective view of one of the pivoted bar members; and Fig. 6 is a detail perspective view of the other bar member.

Referring more particularly to the drawings, 1 indicates the body of a motor vehicle which is provided with the usual rear seat 2 and the front seat 3. In the construction of the seats it will be noted that the front side 4 of the rear seat 2 is hinged to the forward edges of the seat, as shown at 5 and is adapted to be swung outwardly and be arranged in a horizontal position and directly in the same plane as the seat 3 forming a level surface. Hingedly secured to the underside of the front portion 4 of the back seat, are the supporting legs 6 which are securely held in place by means of the hinges 7.

When the front portion 4 is arranged in its raised position, as shown in Fig. 2, the legs 6 are moved to a vertical position so that their lower ends rest upon the bottom of the vehicle body to support the front portion 4 in an upright position. Secured to the forward edge of the member 4, is a stop 8 which, when the member 4 is in its raised position, projects out beyond the edge thereof, the purpose of which will be hereinafter more fully set forth. Hingedly connected to the supporting member 9, which supports the front seat 3, is an auxiliary member 10 which is adapted to be arranged in a horizontal position and the outer end thereof rests upon the extended end of the stop 8 to support the same in position.

From the above it will be readily apparent that the rear or tonneau portion of the motor vehicle may be quickly converted into a sleeping compartment, while the front seat is used for touring purposes and should it be desired to convert the entire body into a sleeping compartment, the front piece 11 which is hingedly connected to the front edges of the seat 3, as shown at 12, is raised and retained in a horizontal position by means of the pivoted bar 13 which is arranged beneath the piece 11.

When arranging the device as an entire sleeping compartment, the back 14 of the front seat which is hinged to the seat 3, as shown at 15, is dropped down to a horizontal position and the outer edge thereof is adapted to rest upon the outwardly extending end of the stop 8. Thus it will be apparent that when the device is converted into a full sleeping compartment, the auxiliary piece 10 is eliminated and is only used when it is desired to use the tonneau as a part sleeping compartment. It will be understood that when only the tonneau of the vehicle is converted into a sleeping compartment, it is preferably used for children, but in touring about the country, the tourist could readily stop between towns and arrange the vehicle into a sleeping compartment by using both the back and rear seats.

It will be apparent from the above description, taken in connection with the accompanying drawings, that I have provided a simple and durable vehicle which can be readily applied to any form of motor vehicle and used to a great advantage without changing the general appearance of the body of the vehicle.

It will be noted that when the members 4 and 11 are in their inoperative position, as illustrated in Fig. 1, there is considerable space left between the upholstering of these members and the edge of the bottom of the seats 2 and 3. This space is filled by means of the removable upholstering portions 16 which are securely held in position by means of the straps 17.

It will also be apparent from the above that these portions of upholstering may be quickly and readily removed when it is desired to convert the body into a sleeping compartment, as illustrated in Fig. 2.

It will also be apparent that I have provided a simple and durable device which can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the invention, as defined by the appended claims.

Having thus described this invention, what I claim is:—

1. A vehicle body including front and rear seat members, movable members hingedly connected to the front edges of said seat members, supports for retaining said members in a horizontal position, one of said supports being provided with an outwardly projecting portion, and a third movable member hingedly connected to the front seat member and adapted to be supported by the outwardly projecting portion, as and for the purpose set forth.

2. A vehicle body including front and rear seat members, a plate member hingedly connected to the front edges of each of said seat members, a third plate member hingedly connected to the rear of the front seat member, said plate members being adapted to be disposed in a horizontal position, and pivoted bars carried by the first plate members for supporting all of said plate members in a horizontal position.

In testimony whereof I hereunto affix my signature in the presence of two witnesses.

EDWARD L. THOMPSON.

Witnesses:
Mrs. E. L. Thompson,
B. F. Martz.

Copies of this patent may be obtained for five cents each, by addressing the "Commissioner of Patents, Washington, D. C."